(12) United States Patent
Chen et al.

(10) Patent No.: US 10,854,009 B2
(45) Date of Patent: Dec. 1, 2020

(54) METHOD, APPARATUS, AND SYSTEM FOR OBTAINING VIRTUAL OBJECT, AND STORAGE MEDIUM

(71) Applicant: TENCENT TECHNOLOGY (SHENZHEN) COMPANY LIMITED, Shenzhen (CN)

(72) Inventors: Zijie Chen, Shenzhen (CN); Jie Gao, Shenzhen (CN); Yongtao Li, Shenzhen (CN); Jianfeng Chen, Shenzhen (CN); Zhijie Xie, Shenzhen (CN); Shipeng Zhang, Shenzhen (CN); Chao Wan, Shenzhen (CN); Lei Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/298,506

(22) Filed: Mar. 11, 2019

(65) Prior Publication Data

US 2019/0206140 A1    Jul. 4, 2019

Related U.S. Application Data

(63) Continuation of application No. PCT/CN2017/102834, filed on Sep. 22, 2017.

(30) Foreign Application Priority Data

Oct. 24, 2016    (CN) .......................... 2016 1 0939708

(51) Int. Cl.
*G06T 19/00*    (2011.01)
*G06F 3/01*    (2006.01)
(Continued)

(52) U.S. Cl.
CPC .............. *G06T 19/006* (2013.01); *G06F 3/01* (2013.01); *G06F 16/00* (2019.01); *G06F 16/587* (2019.01);
(Continued)

(58) Field of Classification Search
None
See application file for complete search history.

(56) References Cited

U.S. PATENT DOCUMENTS

| 9,226,106 | B1 | 12/2015 | Kornmann et al. | |
| 2017/0123750 | A1* | 5/2017 | Todasco | G06F 3/1454 |
| 2017/0201708 | A1* | 7/2017 | Igarashi | G06F 3/048 |

FOREIGN PATENT DOCUMENTS

| CN | 103164518 A | 6/2013 |
| CN | 103377487 A | 10/2013 |

(Continued)

OTHER PUBLICATIONS

The World Intellectual Property Organization (WIPO) International Search Report for PCT/CN2017/102834 date Dec. 1, 2017 5 Pages (including translation).

*Primary Examiner* — YuJang Tswei
(74) *Attorney, Agent, or Firm* — Anova Law Group, PLLC

(57) ABSTRACT

A method for obtaining a virtual object for a first terminal includes obtaining a first current indoor position, and obtaining a second indoor position corresponding to the first indoor position and a corresponding identifier of a virtual object. The second indoor position is a position of the virtual object corresponding to the identifier of the virtual object. The method also includes, when moving from the first indoor position into a first preset position range including the second indoor position, displaying an actual image shot by a camera and, when the actual image includes the second indoor position, displaying the virtual object at a position in (Continued)

the actual image corresponding to the second indoor position, obtaining a selection operation on the virtual object displayed in the actual image, and sending an obtaining request for the virtual object to a server according to the selection operation.

20 Claims, 7 Drawing Sheets

(51) Int. Cl.
    *H04L 29/08* (2006.01)
    *G06Q 30/02* (2012.01)
    *G06F 16/00* (2019.01)
    *G06T 7/70* (2017.01)
    *G06F 16/587* (2019.01)
    *H04W 4/021* (2018.01)
    *H04W 4/33* (2018.01)

(52) U.S. Cl.
    CPC ..... *G06Q 30/0207* (2013.01); *G06Q 30/0241* (2013.01); *G06Q 30/0261* (2013.01); *G06T 7/70* (2017.01); *H04L 67/18* (2013.01); *H04L 67/36* (2013.01); *H04W 4/021* (2013.01); *G06T 2207/30244* (2013.01); *H04W 4/33* (2018.02)

(56) References Cited

FOREIGN PATENT DOCUMENTS

| | | |
|---|---|---|
| CN | 104571532 A | 4/2015 |
| CN | 105450736 A | 3/2016 |
| EP | 2506118 A1 | 10/2012 |
| WO | 2016150541 A1 | 9/2016 |

* cited by examiner

METHOD, APPARATUS, AND SYSTEM FOR OBTAINING VIRTUAL OBJECT, AND STORAGE MEDIUM

RELATED APPLICATIONS

This application is a continuation application of PCT Patent Application No. PCT/CN2017/102834, filed on Sep. 22, 2017, which claims priority to Chinese Patent Application No. 201610939708.2, filed with the Chinese Patent Office on Oct. 24, 2016, and entitled "Method, APPARATUS, AND SYSTEM FOR OBTAINING VIRTUAL OBJECT", which is incorporated herein by reference in its entirety.

FIELD OF TECHNOLOGY

The present disclosure relates to the field of network technologies and, in particular, to a method, apparatus, and system for obtaining a virtual object, and a storage medium.

BACKGROUND

With the increasing development of network technologies and terminal technologies, and popularity of terminals such as smartphones and tablets, many servers start sending virtual objects to user terminals by using the Internet, so that users can obtain the virtual objects by using the user terminals.

However, current methods for sending virtual objects are often applicable outdoors, and are less efficient when used indoors. The disclosed methods and systems are directed to solve one or more problems set forth above and other problems.

SUMMARY

Embodiments of the present invention provide a method, apparatus, and system for obtaining a virtual object, and a storage medium.

One aspect of the present disclosure includes a method for obtaining a virtual object for a first terminal. The method includes obtaining a first current indoor position, and obtaining a second indoor position corresponding to the first indoor position and a corresponding identifier of a virtual object. The second indoor position is a position of the virtual object corresponding to the identifier of the virtual object. The method also includes, when moving from the first indoor position into a first preset position range including the second indoor position, displaying an actual image shot by a camera and, when the actual image shot by the camera includes the second indoor position, displaying the virtual object corresponding to the identifier of the virtual object at a position in the actual image corresponding to the second indoor position. The method also includes obtaining a selection operation on the virtual object displayed in the actual image, and sending an obtaining request for the virtual object to a server according to the selection operation, the obtaining request being used for requesting the server to grant the virtual object.

Another aspect of the present disclosure includes a method for processing a virtual object for a server. The method includes receiving an obtaining request for a virtual object sent by a first terminal. The first terminal is configured to: display, when moving from a first current indoor position into a first preset position range including a second indoor position of the virtual object, an actual image shot by a camera; display, when the actual image shot by the camera contains the second indoor position, the virtual object at a position in the actual image corresponding to the second indoor position; obtain a selection operation on the virtual object displayed in the actual image; and send the obtaining request according to the selection operation, the obtaining request carrying an identifier of the virtual object. The method also includes granting the virtual object corresponding to the identifier of the virtual object to the first terminal.

Another aspect of the present disclosure includes a method for processing a virtual object for a second terminal. The method includes displaying a virtual object setting interface when a virtual object setting operation is detected and, when a confirmation setting operation is detected based on the virtual object setting interface, obtaining a virtual object and a second indoor position set based on the virtual object setting interface. The method also includes sending a virtual object setting request to a server, where the virtual object setting request carries an identifier of the virtual object, the second indoor position, and a second user identifier currently logged into, and is used for requesting the server to establish a correspondence among the identifier of the virtual object, the second indoor position, and the second user identifier, which enables a first terminal to obtain the virtual object corresponding to the identifier of the virtual object when moving from a first current indoor position into a first preset position range including the second indoor position. The second indoor position is a position of the virtual object corresponding to the identifier of the virtual object.

Another aspect of the present disclosure includes an apparatus for processing a virtual object. The apparatus may be applied to a server. The apparatus includes a memory and a processor coupled to the memory. The processor is configured to receive an obtaining request for a virtual object sent by a first terminal. The first terminal is configured to: display, when moving from a first current indoor position into a first preset position range including a second indoor position of the virtual object, an actual image shot by a camera; display, when the actual image shot by the camera contains the second indoor position, the virtual object at a position in the actual image corresponding to the second indoor position; obtain a selection operation on the virtual object displayed in the actual image; and send the obtaining request according to the selection operation, the obtaining request carrying an identifier of the virtual object. The processor is also configured to grant the virtual object corresponding to the identifier of the virtual object to the first terminal.

Another aspect of the present disclosure includes a non-transitory computer-readable storage medium storing computer program instructions. The computer program instructions are executable by at least one processor to perform: obtaining a first current indoor position, and obtaining a second indoor position corresponding to the first indoor position and a corresponding identifier of a virtual object. The second indoor position is a position of the virtual object corresponding to the identifier of the virtual object. The computer program instructions further cause the at least one processor to perform, when moving from the first indoor position into a first preset position range including the second indoor position, displaying an actual image shot by a camera and, when the actual image shot by the camera includes the second indoor position, displaying the virtual object corresponding to the identifier of the virtual object at a position in the actual image corresponding to the second indoor position. The computer program instructions further cause the at least one processor to perform obtaining a selection operation on the virtual object displayed in the actual image, and sending an obtaining request for the virtual object to a server according to the selection operation, the obtaining request being used for requesting the server to grant the virtual object.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings for describing the embodiments. Apparently, the accompanying drawings in the following description show merely some embodiments of the present disclosure, and a person of ordinary skill in the technology may derive other drawings from these accompanying drawings without creative efforts.

DETAILED DESCRIPTION

To make the objectives, technical solutions, and advantages of the embodiments of the present disclosure clearer, the following further describes implementations of the embodiments of the present disclosure in detail with reference to the accompanying drawings.

Before the embodiments of the present disclosure are described in detail, an application scenario of the embodiments of the present disclosure is illustrated.

In some examples, a user terminal may obtain an official account after logging into a user account, and register to a server of the official account. The server then may interact with the user terminal by using the official account, that is, may periodically send information about a virtual object to the registered user account by using the official account, and the user terminal may obtain the virtual object by using the user account. Subsequently, after logging into the user account by using the user terminal, a user may view the obtained virtual object in a virtual object list of the user account.

In this example, the foregoing process is to uniformly send the virtual object to users by using the official account, and the sent virtual object may not be wanted by the users, therefore, not being well targeted. In addition, the user terminal passively receives the virtual object sent by the server, and after obtaining the virtual object, the user views the virtual object in the user account only when the user really has a need, causing low utilization of the obtained virtual object.

Figure 1A:
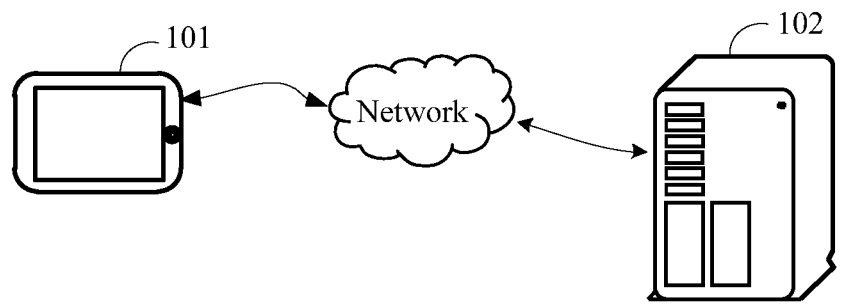
FIG. 1A is a schematic diagram of a system for obtaining a virtual object according to an embodiment of the present disclosure.

In some other examples, a method for obtaining a virtual object provided in the embodiments of the present disclosure is mainly applied to a system for obtaining a virtual object. Referring to FIG. 1A, the system includes a first terminal 101 and a server 102, and the first terminal 101 may be wiredly or wirelessly connected to the server 102.

The first terminal 101 may obtain current position information by using the GPS (global positioning system), and uploads the position information to the server 102; the server 102 may send a virtual object to the first terminal 101 according to the position information sent by the first terminal 101; and the first terminal 101 may display the virtual object sent by the server 102, and interact with a user by using the virtual object. During actual application, the server 102 is generally a server leased by a commercial organization, and the sent virtual object is generally a voucher, a coupon, or the like. Such a virtual object may not only be used as an advertisement promotion, but also attract the user for consumption.

The embodiments of the present disclosure provide a method, apparatus, and system for obtaining a virtual object, and a storage medium. By using the technical solutions of this disclosure, the attractiveness of the virtual object to the user can be improved, and user stickiness can be improved. Thus, an indoor position can be accurately positioned, so that the server can send the virtual object to the user according to indoor position information of the terminal, enriching the ways of interaction, and expanding the application scope.

An embodiment of the present disclosure provides a method for obtaining a virtual object, and the method may be applied to the above disclosed system for obtaining a virtual object.

More specifically, the first terminal 101 is configured to: obtain a first indoor position based on an indoor positioning method; when the first mobile terminal 101 moves within a first preset position range including a second indoor position, from the first indoor position, to display an actual image shot by a camera, the second indoor position being a position corresponding to the virtual object; when a position corresponding to the actual image shot by the camera includes the second indoor position, to display the virtual object at a position that is in the actual image and that corresponds to the second indoor position; to obtain a selection operation on the virtual object displayed in the actual image; and to send an obtaining request for the virtual object to the server 102 according to the selection operation.

The server 102 is configured to: receive the obtaining request for the virtual object sent by the first terminal 101; and grant the virtual object to the first terminal 101.

Figure 1B:
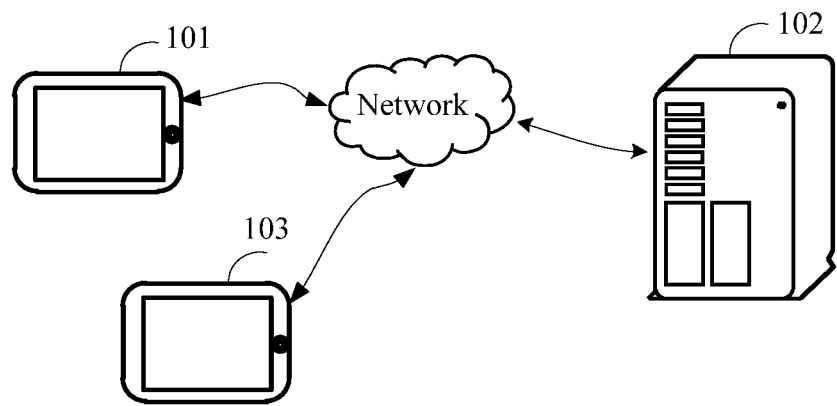
FIG. 1B is a schematic diagram of another system for obtaining a virtual object according to an embodiment of the present disclosure.

Further, referring to FIG. 1B, the system for obtaining a virtual object may further include a second terminal 103, and the second terminal 103 may also connect to the server 101 by using a wired network or a wireless network. The second the terminal 103 is configured to set the virtual object, so that the server 102 sends the virtual object according to the setting of the second terminal 103.

Specifically, the second terminal 103 is configured to: display a virtual object setting interface when the second terminal 103 detects a virtual object setting operation; when detecting a confirmation setting operation based on the virtual object setting interface, obtain the virtual object and the second indoor position that are set based on the virtual object setting interface; and send a virtual object setting request to the server 102, the virtual object setting request carrying the virtual object, second indoor position information, and a second user identifier currently logged into.

The server 102 is configured to: receive the virtual object setting request sent by the second terminal 103; and establish a correspondence between the virtual object, the second indoor position information, and the second user identifier.

Figure 2:
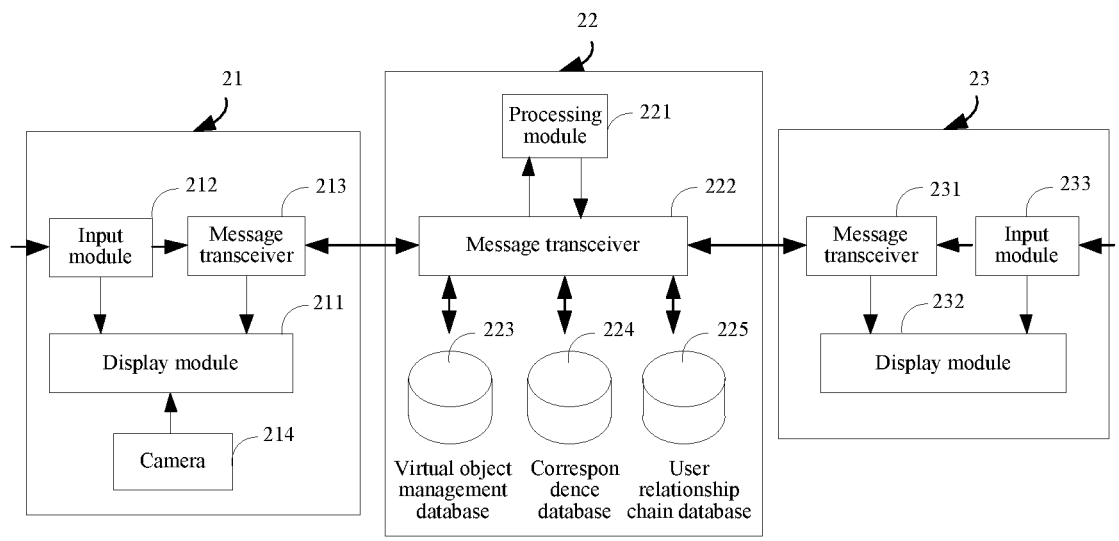
FIG. 2 is a schematic component diagram of a system for obtaining a virtual object according to an embodiment of the present disclosure.

FIG. 2 is a schematic component diagram of a system for obtaining a virtual object according to an embodiment of the present disclosure. Referring to FIG. 2, the following describes components in the system for obtaining a virtual object.

(1) A first terminal 21 includes a display module 211, an input module 212, a message transceiver 213, and a camera 214.

The camera 214 is configured to shoot an actual image. The display module 211 is configured to: display the virtual object or second indoor position information, and the actual image shot by the camera, and display the virtual object at a second indoor position of the actual image. That is, the virtual object is imposed on the actual image at the second indoor position. The display module 211 is further configured to obtain a selection operation of the first terminal 21 on the virtual object in the actual image. The input module 212 is configured to obtain a key-pressing operation, a touchscreen operation, a sliding operation, or the like of a user on the first terminal 21. The message transceiver 213 is configured to: send an obtaining request for the virtual object to the server 22, and receive the virtual object granted by the server 22.

The server 22 includes a processing module 221, a message transceiver 222, a virtual object management database 223, and a correspondence database 224.

The virtual object management database 223 is configured to store virtual objects to be sent at various indoor positions. The message transceiver 222 is configured to: receive the obtaining request for the virtual object sent by the first terminal 21, and grant the virtual object to the first terminal 21. The message transceiver 222 is further configured to receive a virtual object setting request sent by a second terminal 23. The correspondence database 224 is configured to: store a correspondence between the virtual object and a user identifier, or store a correspondence among the virtual object, the second indoor position information, and a user identifier.

The processing module 221 is configured to: send the second indoor position information or send the second indoor position information and the virtual object to the first terminal 21 according to indoor position information of the first terminal 21. In addition, the processing module 221 is further configured to: establish or remove a correspondence between any user identifier and virtual object, or establish or remove a correspondence between any virtual object, second indoor position information, and user identifier, and update the correspondence database 224.

Optionally, the server 22 further includes user relationship chain database 225, the user relationship chain database 225 is configured to store a user relationship chain of each user, and the user relationship chain includes one or more user identifiers.

(3) The second terminal 23 includes a message transceiver 231, a display module 232, and an input module 233.

The display module 232 is configured to display a virtual object setting interface, and is further configured to obtain a virtual object setting operation, a confirmation setting operation, and the like. The input module 233 is configured to obtain a key-pressing operation, a touchscreen operation, a sliding operation, or the like of a user on the second terminal 23. The message transceiver 231 is configured to send the virtual object setting request to the server 22.

Figure 3A:
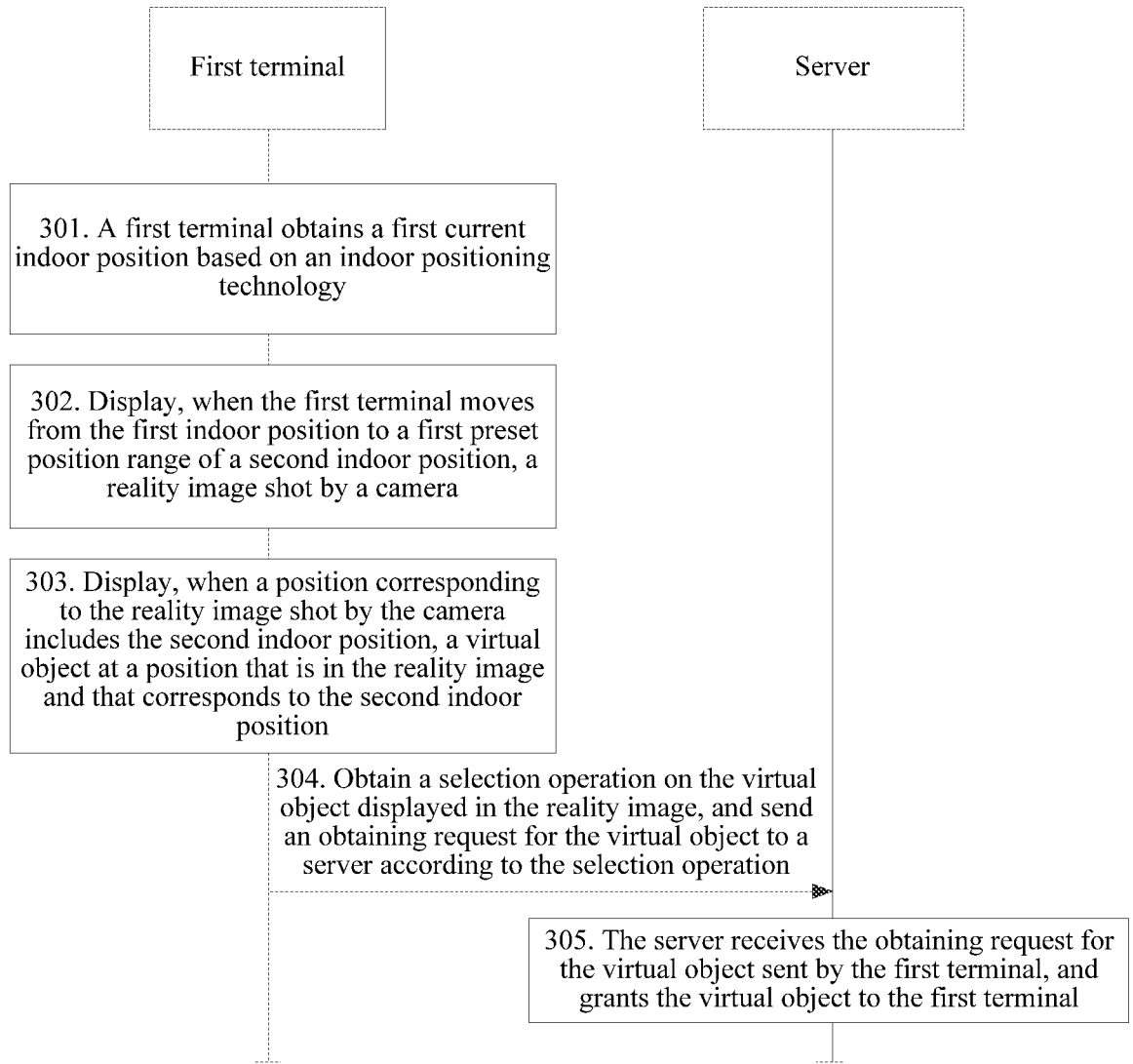
FIG. 3A is a flowchart of a method for obtaining a virtual object according to an embodiment of the present disclosure.

FIG. 3A is a flowchart of a method for obtaining a virtual object according to an embodiment of the present disclosure. The method is applied to a first terminal 101, and interaction entities of the method are the first terminal and a server. Referring to FIG. 3A, the method includes the followings.

S301: The first terminal obtains a first current indoor position based on an indoor positioning method.

In this embodiment of the present disclosure, when currently located at the first indoor position, the first terminal may obtain the first indoor position based on the indoor positioning method, and obtain related virtual object information according to the first indoor position.

The first terminal may be any user terminal. The indoor position may be an indoor position of any closed or semi-closed space, such as a building, a ship hull, or a tunnel. For example, the indoor position may be an indoor position of a building such as a commercial building, an office building, a dwelling, a school, a hospital, or a museum.

The indoor positioning method is a technology that can implement positioning in an indoor environment, and may specifically be one of a wireless communication technology, a base station positioning technology, an inertial navigation positioning technology, and the like, or a set of indoor positioning system formed by integrating a plurality of positioning technologies. In addition, under different indoor positioning technologies, the first terminal may obtain first indoor position information only by using the first terminal, or obtain the first indoor position information by coordinating with the server. This is not limited herein.

In an embodiment, the indoor positioning method may be a beacon indoor positioning method in wireless communication. During actual application, a plurality of beacon devices may be arranged indoors, and the server may store an identifier of each beacon device and corresponding position information. Correspondingly, in a process of obtaining the first current indoor position based on the indoor positioning method, the first terminal may receive a beacon signal broadcasted by at least one beacon device disposed indoors, the beacon signal carrying the identifier of the beacon device; determine signal strength corresponding to the received beacon signal; obtain the first current indoor position according to the identifier of the beacon device and the signal strength corresponding to the received beacon signal.

The at least one beacon device is a beacon device located around the first terminal, and in terms of the distance, can broadcast the beacon signal to the first terminal. That is, the first terminal is located within a broadcast range of the at least one beacon device. After receiving the beacon signal broadcast by the at least one beacon device, the first terminal may determine the signal strength corresponding to the received beacon signal broadcast by each beacon device.

The signal strength may indicate a distance between the first terminal and the corresponding beacon device.

The first terminal may send the identifier of the at least one beacon device and the corresponding signal strength to the server, and the server determines the first indoor position information according to the identifier of the at least one beacon device and the corresponding signal strength, and returns the first indoor position information to the first terminal. Specifically, after receiving the identifier of the at least one beacon device and the corresponding signal strength, the server may search for position information of each beacon device according to the identifier of each beacon device, and analyze and determine the first current indoor position information of the first terminal with reference to the signal strength corresponding to each beacon device.

It should be noted that the above disclosed embodiments of the present disclosure use only an example in which the first terminal sends the identifier of the beacon device and the corresponding signal strength to the server, and the server determines the first indoor position information of the first terminal according to the identifier of the beacon device and the corresponding signal strength. During actual application, the first terminal may alternatively store identifiers of a plurality of beacon devices and corresponding position information, so as to directly determine the first current indoor position information of the first terminal according to the identifier of the beacon device and the corresponding signal strength which are not needed to be sent to the server for determining. Alternatively, in another implementation, the beacon signal broadcast by the beacon device may further carry the position information of the beacon device, so that the first terminal does not need to store the position information of each beacon device, and can determine the first current indoor position information only according to the beacon signal and the corresponding signal strength.

The beacon device may be a routing forward device, a terminal device or the like, and the identifier of the beacon device may be a factor sequence number, a Media Access Control (MAC) address or the like of the beacon device.

In addition, in this embodiment of the present disclosure, the server may alternatively pre-store a plurality of pieces of virtual object information, the virtual object information includes a present identifier of the virtual object and corresponding second indoor position information, and the second indoor position information is used for indicating a second indoor position of the virtual object.

Therefore, after obtaining the first current indoor position, the first terminal may alternatively send the first indoor position information to the server, and the first indoor position information is used by the server to obtain and send at least one piece of virtual object information related to the first indoor position. The first terminal then can receive the virtual object information sent by the server, and display the virtual object at the second indoor position corresponding to the virtual object according to the virtual object information.

The virtual object may be a virtual ticket, a virtual currency, a virtual pet, a virtual item, or the like. For example, the virtual ticket may include a coupon, a discount voucher, a voucher, a cash voucher, or the like. The form of the virtual object is not limited herein. In addition, during actual application, the virtual object may alternatively be presented in a form of a red envelope.

The displayed virtual object may be an icon, an animation, a name, or the like of the virtual object.

Further, the first terminal may display an indoor map, and display the virtual object at the second indoor position of the indoor map. The indoor map is an indoor map obtained according to the first indoor position information, and may indicate a layout of indoor space in which the first terminal is currently located. For example, when the first terminal is currently located in an indoor shopping place, the indoor map may display position information of a store, a restroom, an elevator, a resting area, a gateway, or the like around the first terminal. In addition, the indoor map may be an entire indoor map, or a local indoor map, or a two-dimensional indoor map, or a three-dimensional indoor map. This is not limited herein. In addition, the indoor map may be an indoor map pre-stored by the first terminal, or an indoor map delivered by the server according to the first indoor position. This is not limited herein.

The indoor map is displayed and the virtual object is displayed at the second corresponding indoor position of the indoor map, so that a user can clearly view indoor space information and can view positions at which a to-be-obtained virtual object is located, so as to guide the user to select a desired virtual object and move to a position of the selected virtual object, thereby arousing enthusiasm of the user for obtaining the virtual object.

It should be noted that, the first terminal may directly obtain, when detecting that the first terminal is located at the first indoor position, the first indoor position information and send the first indoor position information to the server, to obtain the virtual object information sent by the server; and certainly, the first terminal may alternatively obtain, only when detecting a designated operation and detecting that the first terminal is located at the first indoor position, the first indoor position information and send the first indoor position information to the server, to obtain the virtual object information from the server. This is not limited herein. The designated operation may be an operation that can trigger the first terminal to obtain the virtual object information. For example, the first terminal may perform the method for obtaining a virtual object by using an application, and the designated operation may be an operation of starting the application, or a selection operation on an option of obtaining virtual object information in the application.

It also should be noted that the above uses only an example of displaying the virtual object at the second indoor position of the corresponding virtual object according to the virtual object information for description. During actual application, alternatively, the first terminal may not display the virtual object, but only display prompt information used for indicating the second indoor position in the indoor map, and the prompt information may be a position mark, for example, a point representing a position in the indoor map.

Further, to enable the user to clearly learn a route to the second indoor position, the first terminal may also display prompt information used for indicating the first indoor position information in the indoor map. The prompt information used for indicating the first indoor position information may be an identifier, a position mark, or the like of the first terminal. For example, the first terminal may display a first mark and a second mark, the first mark is used for indicating the first indoor position information, and the second mark is used for indicating the second indoor position information.

In an embodiment, after receiving the first indoor position information sent by the first terminal, the server may directly send the second indoor position information to the first terminal according to the first indoor position information, and certainly, may alternatively send the virtual object information, and the virtual object information carries the second indoor position information.

The process in which the server sends the second indoor position information to the first terminal according to the first indoor position information may include the following two ways.

The first way: Determining a second preset position range of the first indoor position information; searching a database for the second indoor position information within the second preset position range; and sending the second indoor position information to the first terminal.

The second preset position range may be set by the server by default, or set by the terminal, or set by the server negotiating with the terminal. This is not limited herein. For example, the second preset position range may be a range using the first indoor position as a center, and 30 meters as a radius. For another example, the second preset position range may be a range of an entire building of the first indoor position.

The server may pre-store the second indoor position information within a plurality of indoor position ranges in the database, and virtual objects corresponding to the second indoor position information, to subsequently search the database for second indoor position information within a certain indoor position range. For example, the server may pre-store virtual objects and the second indoor position information provided by stores in a plurality of commercial buildings in the database, and when the first terminal is located in any commercial building, the server may search the database for the virtual objects and the second indoor position information within a second preset position range of a position of the first terminal, to send the virtual objects provided by surrounding stores to the first terminal.

Further, to provide more accurate services for the user, a type search option of the virtual object may be added to cause the server to only send virtual objects of this type. For example, when the user searches for fine food, the server may only send the virtual objects provided by restaurants within the second preset position range to the user.

Correspondingly, the process of searching the database for the second indoor position information within the second preset position range may include searching the database for the second indoor position information that corresponds to the virtual object belonging to the preset type and that is within the second preset position range. The preset type may be set by the user by using the first terminal, or set by the server by default. This is not limited herein.

The second way: Determining the second indoor position information according to the first indoor position information and a preset moving policy; generating the virtual object corresponding to the second indoor position information; and sending the second indoor position information and the virtual object to the first terminal.

The preset moving policy is used for determining a moving format of the first terminal, and the second indoor position information corresponding to the first indoor position information may be generated according to the preset moving policy. The preset moving policy may specifically include a preset moving distance, a preset exercise amount, a preset moving route, and the like. In addition, the preset moving policy may be set by the server by default, or set by the terminal. This is not limited herein.

For example, when the preset moving policy is the preset moving distance, the second indoor position is a position at a distance of the preset moving distance from the first indoor position. For example, when the preset moving distance is 500 meters, the second indoor position is a position at a distance of 500 meters from the first indoor position. Further, the preset moving policy may further include the preset moving distance and a preset moving direction, and the second indoor position is a position that is in the moving direction and is at a distance of the preset moving distance from the first indoor position.

When the preset moving policy is the preset exercise amount, the second indoor position is a position that is calculated by using a preset motion algorithm and that can only be reached by the user moving from a first preset position after consuming the preset exercise amount. For example, when the preset exercise amount is 5,000 calories, the second indoor position is a position that can only be reached by the user moving from the first preset position after consuming 5,000 calories. Further, the preset moving policy may further include a preset exercise format, and the second indoor position is a position that can only be reached by moving from the first preset position in the preset exercise format. For example, because two sports: walking and climbing stairs, are of great benefit to human health and have a low requirement on an environment and appliance, the preset exercise format may be set as an exercise format of walking+climbing stairs.

In real life, a building has become a main work place of most users, and with the increasing development of computer technologies, most users need to sit at office cubicles for a long time to face the computers to work, consequently, the users lack exercises and body health is affected. The several preset moving policies may ensure that the obtained second indoor position can be reached by the user only after a certain exercise amount, thereby stimulating the users to work out and exercise indoors.

For another example, when the preset moving policy is the preset moving route, the second indoor position is a position determined according to the first indoor position and the preset moving route. In real life, the fire safety is used as an example. Although many users work in the building for a long time, the users may not know a fire passage or an exit passage in the building. If an emergency occurs, the users may lose an escape route due to hurry and confusion. Therefore, in one embodiment of the present disclosure, the preset moving route may be set to the fire protection route, the escape route, or the like, and the users may reach the second indoor position according to the fire protection route or the escape route, so that the user can familiarize themselves with the fire protection route or the escape route, thereby publicizing safety knowledge such as fire protection and security.

Further, the server may alternatively generate virtual objects corresponding to different level for different second indoor position information. For example, an example in which the preset moving policy includes the preset moving distance is used. The server may generate a virtual object of a first level for a second indoor position at a distance of 50 meters from the first indoor position; generate a virtual object of a second level for a second indoor position at a distance of 100 meters from the first indoor position; generate a virtual object of a third level for a second indoor position at a distance of 150 meters from the first indoor position; and the like. By setting virtual objects of different levels, the users may be further stimulated to exercise.

Further, the first terminal may interact with the server by using an application, to obtain the virtual object and the second indoor position information sent by the server according to the present moving policy. For example, the application is an exercise game application. When a user chooses to participate an exercise game in the exercise game application, the first terminal may obtain the first current indoor position information, and upload the first indoor position information to a backend server of the exercise game application. After obtaining the first indoor position information, the backend server may send the second indoor position information to the user according to the first indoor position information and the present moving policy, and generate a virtual object at the second indoor position for the user to obtain.

S302: Displaying, when the first terminal moves within a first preset position range including a second indoor position, from the first indoor position, an actual image shot by a camera.

During actual application, the first terminal may display one or more pieces of second indoor position information to indicate the virtual objects, or display the virtual objects at one or more second indoor positions, so that the user may select one of the second indoor positions according to a preference of the user and move within the first preset position range of the second indoor position.

The first preset position range may be set by the terminal by default, or may be set by the user. This is not limited herein. For example, the first preset position range may be a position range using the second indoor position as a center, and 5 meters as a radius.

It should be noted that, when the first terminal moves to the first preset range of the second indoor position, if the camera is turned on, the actual image shot by the camera may be directly displayed; and if the camera is not turned on, the camera may be turned on first to shoot an image, and the actual image shot by the camera is then displayed. When the camera is not turned on, an operation of turning on the camera may be automatically triggered by the first terminal when detecting that the first terminal is currently located in the first preset position range of the second indoor position, or may be trigger by the user. This is not limited herein.

It should also be noted that one embodiment of the present disclosure uses only an example in which the indoor map is displayed first, and the second indoor position is displayed in the indoor map, so that the user searches for the virtual object according to the second indoor position displayed in the indoor map, and when the user moves to the first preset range of any second indoor position according to the map, the actual image shot by the camera is displayed then for description. During actual application, when located at the first indoor position, the first terminal may directly turn on the camera, and display the second indoor position in the actual image shot by the camera, so that the user searches for the virtual object according to the second indoor position displayed in the actual image.

S303: Displaying, when a position corresponding to the actual image shot by the camera includes the second indoor position, the virtual object at a position that is in the actual image and that corresponds to the second indoor position.

Figure 3B:
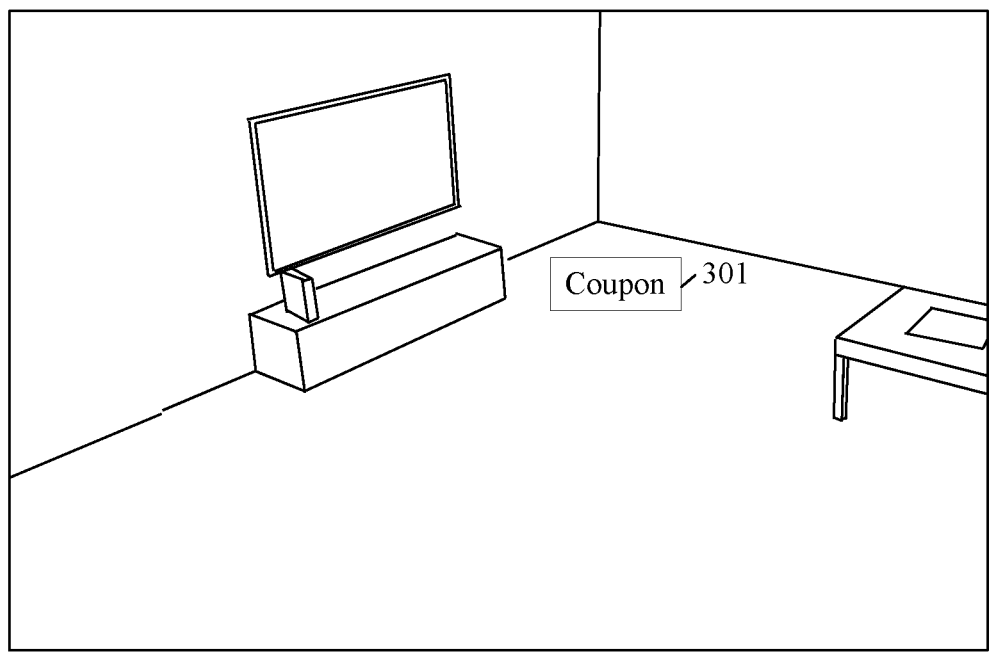
FIG. 3B is a schematic diagram of an image shot by a camera according to an embodiment of the present disclosure.

For example, referring to FIG. 3B, the virtual object is a virtual coupon, and a second indoor position corresponding to the virtual coupon is at a corner of wall. When the camera of the first terminal is directed at the corner of wall to shoot an image, and the actual image shot by the camera includes the second indoor position, the first terminal may display the actual image shown in FIG. 3B, and the second indoor position of the actual image displays a virtual coupon 301.

The displaying process of S303 may include the following implementations.

The first way: Obtaining a shooting angle of the camera and determine whether the shooting angle of the camera accords with a preset angle, the preset angle being an according angle directed at the second indoor position; and determine, when the shooting angle of the camera accords with the preset angle, that the position corresponding to the actual image shot by the camera includes the second indoor position, and display the virtual object at the position that is in the actual image and that corresponds to the second indoor position.

The preset angle may be determined according to a current position of the first terminal and the second indoor position. The preset angle is used for indicating that when located at the current position, the camera can be directed at the second indoor position, that is, the second indoor position can be within a shooting range of the camera, only when the camera shoots an image according to the preset angle.

When the first terminal is located within the preset range of the second indoor position, the first terminal may obtain the shooting angle of the camera in real time, to determine, according to the shooting angle, whether the position corresponding to the actual image shot by the camera includes the second indoor position. In addition, when the first terminal does not move within the first preset position range of the second indoor position, or the first terminal moves within the first preset position range of the second indoor position but the shooting angle of the camera does not accord with the preset angle, it may be determined that the position corresponding to the actual image shot by the camera does not include the second indoor position.

During actual application, the shooting angle of the camera may be determined according to a posture and a direction of the first terminal. The posture of the first terminal may be obtained by using an accelerometer or a gyroscope, and the direction of the first terminal may be obtained by using a compass. For example, when the second indoor position is on a ceiling, it may be determined that the shooting angle of the camera accords with the preset angle of the second indoor position when it is determined that a back of the first terminal faces upward. For another example, when the second indoor position is on a wall in a south direction of the first terminal, it may be determined that the shooting angle of the camera accords with the preset angle of the second indoor position when it is determined that the first terminal is vertical and a side to which the camera is mounted faces the south direction.

It should be noted that, one embodiment of the present disclosure uses only an example of determining the shooting angle of the camera according to the posture and the direction of the first terminal for description. During actual application, the shooting angle of the camera may be determined in another way. This is not limited herein.

The first terminal may display the virtual object at the second indoor position in the actual image by using an augmented reality (AR) technology. The AR technology is a technology for combining virtual images and text with real scenery. One embodiment of the present disclosure may project the virtual object into the actual image shot by the camera by means of combining the AR technology and the camera. Because the virtual object is displayed in the actual image to interact with the user, immersive experience and interest of the user are greatly increased, thereby improving user stickiness.

Specifically, the first terminal may obtain a virtual object display style corresponding to the second indoor position, and generate the virtual object at the second indoor position in the actual image according to the display style. The virtual object display style may be an icon, an animation, or the like of the virtual object, therefore, the first terminal may synthesize the virtual object display style with the second indoor position in the actual image, so that the actual image may display the virtual object at the position corresponding to the second indoor position. In addition, the virtual object display style may be obtained from the server, and may be obtained from the server in advance and locally stored.

The second way: Restoring the actual image to a three-dimensional scene by using a camera calibration technology; identifying a position range of the three-dimensional scene, and determining whether the second indoor position is included in the position range of the three-dimensional scene; and determining, if the second indoor position is included in the position range of the three-dimensional scene, that the position corresponding to the actual image shot by the camera includes the second indoor position, and display the virtual object at the to position that is in the actual image and that corresponds to the second indoor position.

The camera calibration technology is a technology that can restore a two-dimensional image shot by a camera to a three-dimensional scene. A space position in the three-dimensional scene may be identified by performing calibration on the three-dimensional scene, and then whether the second indoor position is included in the position range of the three-dimensional scene is determined. In addition, when it is determined that the second indoor position is included in the position range of the three-dimensional, a specific position of the second indoor position in the three-dimensional scene may also be determined. That is, the position that is in the actual image and that corresponds to the second indoor position is determined, to display the virtual object at the second indoor position. Referring to the related description of the first way for displaying the virtual object at the second indoor position. Details are not described again.

Further, the process of identifying the space position in the actual image by using the camera calibration technology is relatively complex, and if each shot actual image is identified by using the camera calibration technology, the processing load is excessively large for the first terminal. Therefore, to reduce the processing load of the first terminal and improve display efficiency, whether the position corresponding to the shot actual image includes the second indoor position may alternatively be determined first according to the preset angle of the camera, and when it is determined that the position corresponding to the shot actual image includes the second indoor position, the actual image is then identified by using the camera calibration technology, to identify the position of the second indoor position in the actual image, so as to display the virtual object at the second indoor position.

Specifically, when located within the first preset position range of the second indoor position, the first terminal may obtain the shooting angle of the camera, and determine whether the shooting angle of the camera accords with the preset angle; determine, when the shooting angle of the camera accords with the preset angle, that the position corresponding to the actual image shot by the camera includes the second indoor position; determine, based on the camera calibration technology, the position that is in the actual image and that corresponds to the second indoor position; and display the virtual object at the corresponding position.

The third way: Sending the actual image shot by the camera to the server, to cause the server to determine that the position corresponding to the actual image includes the second indoor position, generating the virtual object at the position that is in the actual image and that corresponds to the second indoor position, to obtain an actual image in which the virtual object is generated, and sending the actual image in which the virtual object is generated; receiving the actual image in which the virtual object is generated and that is sent by the server; and displaying the actual image in which the virtual object is generated. Referring to the related description of the first way and the second way for a process in which the server determines the second indoor position in the actual image and generates the virtual object at the second indoor position. Details are not described again.

Accordingly, the shot actual image is sent to the server and the server performs the identifying and synthesis processing, thereby processing pressure of the first terminal is reduced. In addition, because a processing speed of the server is relatively high, efficiency of displaying the virtual object by the first terminal is also improved.

S304: Obtaining a selection operation on the virtual object displayed in the actual image, and sending an obtaining request for the virtual object to a server according to the selection operation, the obtaining request being used for requesting the server to grant the virtual object.

The selection operation on the virtual object may be an operation of clicking on the virtual object in the actual image, an operation of clicking on the second indoor position information, or the like. This is not limited herein.

The obtaining request for the virtual object may carry the identifier of the virtual object, and a first user identifier currently logged into on the first terminal, and is used for requesting the server to grant the virtual object to the first terminal. The identifier of the virtual object may be a name, a number, or the like of the virtual object, and the first user identifier may be a user nickname, a user account, or the like of the first terminal.

S305: The server receives the obtaining request for the virtual object sent by the first terminal, and grants the virtual object to the first terminal.

The process of granting the virtual object to the first terminal may include: establishing a correspondence between the virtual object and the first user identifier currently logged into on the first terminal. Specifically, the correspondence between the virtual object and the first user identifier may be established by establishing a correspondence between the identifier of the virtual object and the first user identifier.

Further, after obtaining the virtual object, the first terminal may also cancel displaying the virtual object in the actual image, that is, delete the virtual object in the actual image.

It should be noted that if the server sends the second indoor position information to the first terminal by using the second way in the S301, the first terminal can obtain the virtual object only when the moving route of first terminal moving, from the first indoor position, within the first preset position range of the second indoor position accords with the preset moving policy; otherwise, the first terminal cannot obtain the virtual object.

The process of determining whether the moving route accords with the preset moving policy may be performed by the first terminal, or may be performed by the server. This is not limited herein.

(1) When the process of determining whether the moving route accords with the preset moving policy is performed by the first terminal, the server may also send the preset moving policy to the first terminal after the server determines the second indoor position information according to the preset moving policy. Before sending the obtaining request for the virtual object to the server according to the selection operation, the first terminal may also obtain via position information in the process of moving, from the first indoor position, within the first preset position range of the second indoor position; determine, according to the via position information, the moving route of moving, from the first indoor position, within the first preset position range of the second indoor position; determine whether the moving route accords with the preset moving policy; and sending the obtaining request for the virtual object to the server according to the selection operation when the moving route accords with the preset moving policy.

The via position information of the first terminal is position information of the first terminal in the process of moving, from the first indoor position, within the first preset position range of the second indoor position. In the process in which the first terminal moves, from the first indoor position, within the first preset position range of the second indoor position, the first terminal may obtain the via position information of the first terminal in real time, or periodically obtain the via position information of the first terminal. In the process of moving, the via position information of the first terminal may be indoor position information or outdoor position information, and may be obtained based on the indoor positioning method when is the indoor position information.

(2) When the process of determining whether the moving route accords with the preset moving policy is performed by the server, the first terminal may obtain the via position information of the first terminal in the process of moving, from the first indoor position, within the first preset position range of the second indoor position, and send the via position information to the server. Before granting the virtual object to the first terminal, the server may further obtain the via position information sent by the first terminal in the process of moving, from the first indoor position, within the first preset position range of the second indoor position; determine, according to the via position information, the moving route of the first terminal moving, from the first indoor position, within the first preset position range of the second indoor position; determine whether the moving route accords with the preset moving policy; and perform the step of granting the virtual object to the first terminal when the moving route accords with the preset moving policy.

It should be noted that when the process of determining whether the moving route accords with the preset moving policy is performed by the first terminal, an interaction processing between the first terminal and the server may be simplified, thereby reducing a network load; and when the step of determining whether the moving route accords with the preset moving policy is performed by the server, the processing load of the first terminal may be reduced.

Accordingly, in the method for obtaining a virtual object provided in one embodiment of the present disclosure, the indoor positioning method and the virtual reality technology are combined with the virtual object, to be applied to a scenario of obtaining the virtual object indoors. Therefore, in an indoor scenario, an application scenario and an interaction form of the virtual object are extended by means of interaction between the actual image of the camera and the virtual object. In addition, such an interaction form may arouse enthusiasm of the user for obtaining the virtual object, thereby increasing frequency of obtaining the virtual object and facilitating information spreading.

Thus, the first terminal may obtain the first current indoor position based on the indoor positioning method, to obtain the second indoor position of the virtual object according to first indoor position. Because the virtual object sent to the first terminal is sent according to the current position of the first terminal, the sent virtual object is targeted. In addition, the virtual object is displayed in the actual image only when the first terminal moves into the first preset position range of the second indoor position and when the position corresponding to the actual image shot by the camera includes the second indoor position; and the virtual object is sent only when the selection operation on the virtual object is detected. The interaction process may guide the user to move, shoot the image, and perform the obtaining operation, and the user may view and actively obtain the virtual object in the interaction process, so that the utilization of the virtual object is relatively high, thereby the utilization of the virtual object is improved.

It should be noted that the embodiments of FIG. 3A use only an example in which the server sends the virtual object and the corresponding second indoor position information to the first terminal, so that the first terminal obtains the virtual object sent by the server for description, that is, uses the interaction process between the first terminal and the server as an example only for description. During actual application, the virtual object and the corresponding position information sent by the server to the first terminal may alternatively be set by a second terminal. That is, before interacting with the first terminal, the server may alternatively interact with the second terminal first, obtain the second indoor position information and the virtual object that are set by the second terminal, and interact with the first terminal according to the setting of the second terminal.

Specifically, the interaction process between the second terminal and the server is described in detail in the followings.

Figure 4:
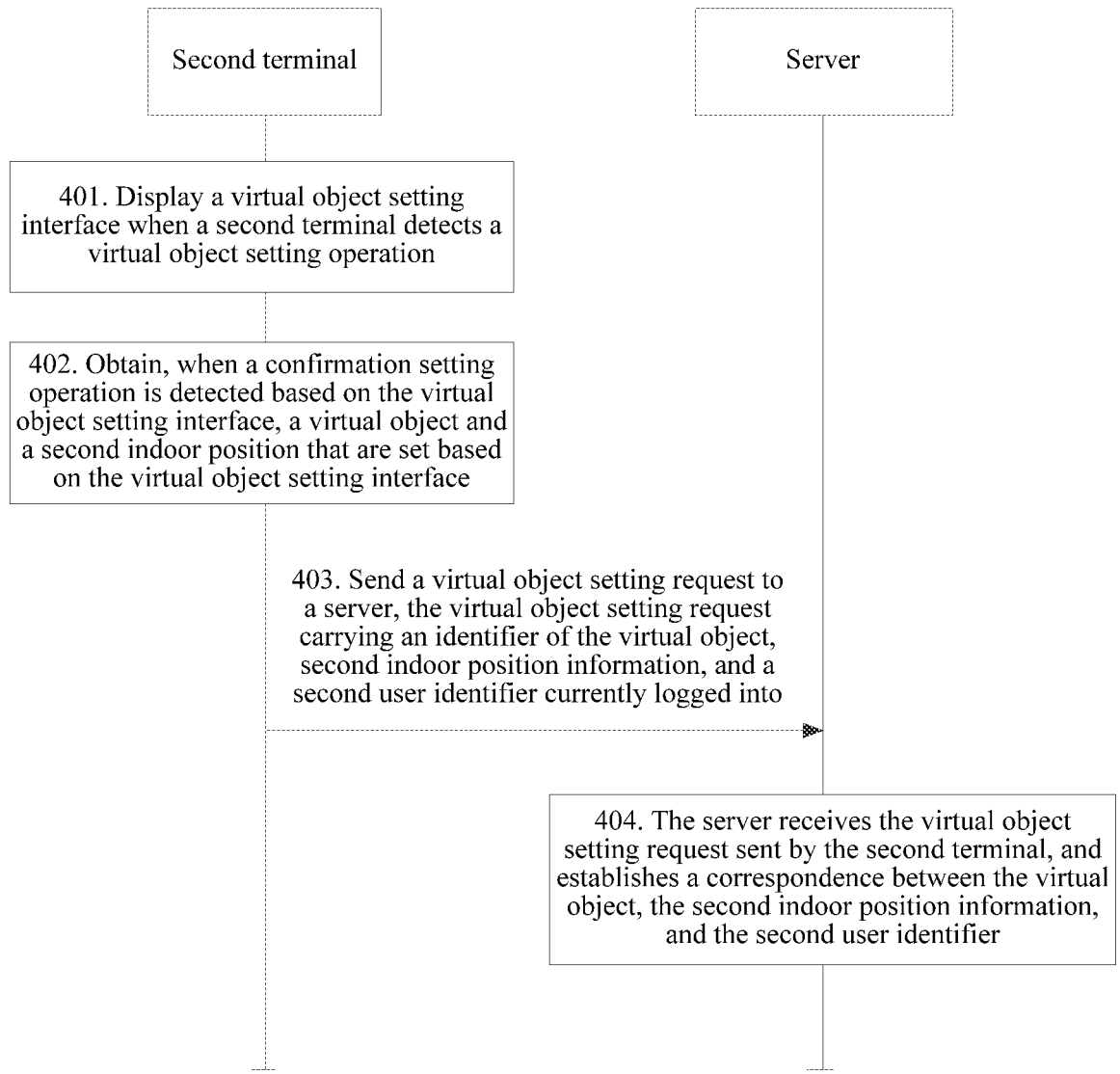
FIG. 4 is a flowchart of another method for obtaining a virtual object according to an embodiment of the present disclosure.

FIG. 4A is a flowchart of a method for obtaining a virtual object according to an embodiment of the present disclosure. The method is applied to a second terminal 103, and interaction entities of the method are the second terminal and a server. Referring to FIG. 4A, the method includes the followings.

S401: Displaying a virtual object setting interface when the second terminal detects a virtual object setting operation.

The second terminal may set the virtual object by using an application, and the virtual object setting operation may be an operation of starting the application, or a selection operation on a setting option in the application.

The virtual object setting interface is used for setting the virtual object, and may be specifically used for setting the virtual object and the second indoor position corresponding to the virtual object.

In one embodiment of the present disclosure, a process of setting the second indoor position may include the following two implementations.

The first way: Setting the second indoor position based on an indoor map.

In an embodiment, the second terminal may obtain third indoor position information based on an indoor positioning method when detecting a position setting operation based on the virtual object setting interface, the third indoor position information being used for indicating a third current indoor position of the second terminal; obtain the indoor map according to the third indoor position information; display the indoor map and display the third indoor position information in the indoor map; and determine a designated position as the second indoor position when detecting a selection operation on the designated position in the indoor map. Referring to the related description about obtaining the first indoor position information based on the indoor positioning method in FIG. 3A for an implementation process of obtaining the third indoor position information based on the indoor positioning method. Details are not described again.

The selection operation on the designated position in the indoor map may be an operation of clicking on the designated position in the indoor map, and the designated position may be any position in the indoor map.

The second way: Setting the second indoor position based on an actual image shot by a camera.

In an embodiment, the second terminal may turn on the camera when detecting a position setting operation based on the virtual object setting interface, and display the actual image shot by the camera; and determine a designated position as the second indoor position when detecting a selection operation on the designated position in the actual image.

The selection operation on the designated position in the actual image may be an operation of clicking on the designated position in the actual image, and the designated position may be any position in the actual image.

The second terminal may determine the selected designated position in the actual image by using a camera calibration technology, so as to project the position clicked on by the user to a designated position of real indoor space. Certainly, the second terminal may alternatively determine the selected designated position in the actual image by using another technology. This is not limited herein.

S402: Obtaining, when a confirmation setting operation is detected based on the virtual object setting interface, a virtual object and a second indoor position that are set based on the virtual object setting interface.

The confirmation setting operation may be a selection operation on a confirmation setting option or the like.

S403: Sending a virtual object setting request to the server, the virtual object setting request carrying an identifier of the virtual object, second indoor position information, and a second user identifier currently logged into.

The second indoor position information is used for indicating the second indoor position, and the identifier of the virtual object is used for indicating the virtual object. The identifier of the virtual object may be a name, a number, or the like of the virtual object, and the second user identifier may be a user nickname, a user account, or the like of the second terminal.

S404: The server receives the virtual object setting request sent by the second terminal, and establishes a correspondence between the virtual object, the second indoor position information, and the second user identifier.

Specifically, the server may establish the correspondence between the virtual object, the second indoor position information, and the second user identifier by means of establishing a correspondence between the identifier of the virtual object, the second indoor position information, and the second user identifier.

It should be noted that the server may store a plurality of pieces of set second indoor position information and the corresponding virtual objects by means of establishing the foregoing correspondence. The server then may send the second indoor position information to a first terminal according to a first indoor position when the first terminal is located at the first indoor position, to cause the first terminal to obtain the virtual object at the second indoor position according to S301 to S305.

After the server receives an obtaining request for the virtual object sent by the first terminal, the server may establish a correspondence between the virtual object and a first user identifier currently logged into on the first terminal, to grant the virtual object to the first terminal. Further, while establishing the correspondence, the server may also remove the correspondence between the virtual object, the second indoor position information, and the second user identifier.

For example, a merchant may set a virtual object provided by the merchant by using the second terminal in the foregoing way, and to improve a promotion effect, the merchant may further set a second indoor position of the virtual object on a signboard or a logotype (Logo) of the merchant.

Further, to promote interaction, the second terminal may further designate a receiver of the virtual object, so that the server sends the virtual object to the designated receiver.

Specifically, the process of obtaining, when a confirmation setting operation is detected based on the virtual object setting interface, a virtual object and a second indoor position that are set based on the virtual object setting interface may include: obtaining, when the confirmation setting operation is detected based on the virtual object setting interface, the virtual object, the second indoor position, and a designated user identifier that are set based on the virtual object setting interface. The designated user identifier is used for indicating a receiver of the virtual object; and correspondingly, the virtual object setting request further carries the designated user identifier and is used for instructing the server to grant the virtual object only to the first terminal on which the designated user identifier is logged into, but not to grant the virtual object to a terminal on which another user identifier is logged into.

When the virtual object is provided with the corresponding receiver, that is, the designated user identifier, the obtaining request for the virtual object sent by the first terminal in the embodiment of FIG. 1B further needs to carry a first user identifier currently logged into on the first terminal. Correspondingly, after receiving the obtaining request and before granting the virtual object to the first terminal, the server further needs to determine whether the first user identifier is the designated user identifier, and then performs the step of granting the virtual object to the first terminal when the first user identifier is the designated user identifier.

The designated user identifier may be a user identifier selected by the second terminal from the user relationship chain of the second user identifier, that is, a selected friend of the second user identifier, or may be a user identifier of the receiver designated in another way. This is not limited herein.

Further, after receiving the designated user identifier, the server may push the virtual object only to the first terminal on which the designated user identifier is logged into, or the server may push the virtual object to any user terminal, but only the first terminal on which the designated user identifier is logged into can obtain the virtual object.

Relatives and friends may give the virtual object to each other as a present by using the foregoing way of designating the receiver of the virtual object. An example in which the virtual object is a red envelope is used. Assuming that A, B, and C are colleagues and work in same indoor space, to promote friendship, A may set, by using a terminal, a red envelope of a certain amount as a virtual object to be given as a present; after setting the red envelope, A may select to put the virtual object at a designated position in an indoor map, and select B and C as the receivers; after the setting is completed, the server may send the red envelope and the designated position to first terminals on which B and C respectively logs; and B and C may automatically move to a preset position range of the designated position according to the sent designated position, and turn on cameras of the terminals to search for the red envelope, to obtain the red envelope given as a present by A. Such a way may increase the interaction between people, and strengthen the relationship between people, thereby forming a close social relationship.

In one embodiment of the present disclosure, the second terminal may display the virtual object setting interface when detecting the virtual object setting operation, so that the user sets the virtual object and the corresponding second indoor position in the virtual object setting interface, then may obtain the set virtual object and second indoor position when detecting the confirmation setting operation based on the virtual object setting interface, send the virtual object setting request to the server, and request the server to establish the correspondence between the virtual object, the second indoor position information, and the second user identifier currently logged into on the second terminal, to send the virtual object and the second indoor position information to the first terminal according to the setting of the second terminal. Because the virtual object and the corresponding second indoor position to be sent may be set by the user, the accuracy of the virtual object to be sent is improved, interaction may be promoted, and user stickiness can be improved.

Figure 5:
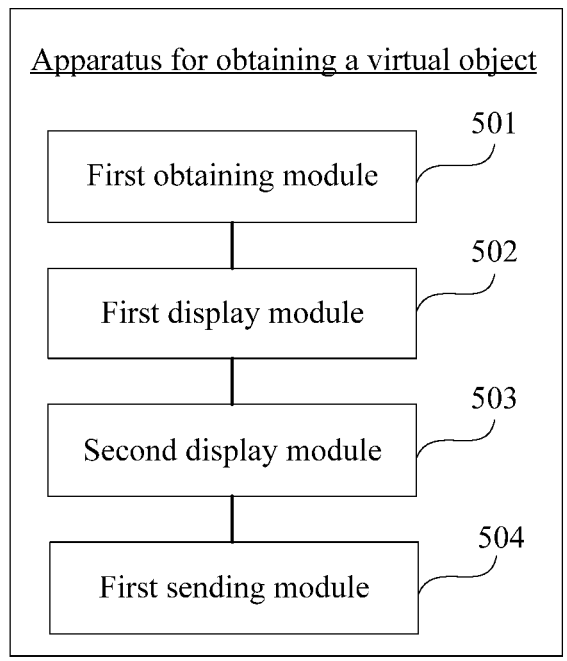
FIG. 5 is a block diagram of an apparatus for obtaining a virtual object according to an embodiment of the present disclosure.

FIG. 5 is a block diagram of an apparatus for obtaining a virtual object according to an embodiment of the present disclosure. The apparatus may be a terminal. Referring to FIG. 5, the apparatus includes a first obtaining module 501, a first display module 502, a second display module 503, and a first sending module 504.

The first obtaining module 501 may be configured to perform S301 of the foregoing embodiments. The first display module 502 is configured to perform S302 of the foregoing embodiments. The second display module 503 is configured to perform S303 of the foregoing embodiments. The first sending module 504 is configured to perform S304 of the foregoing embodiments.

Figure 6:
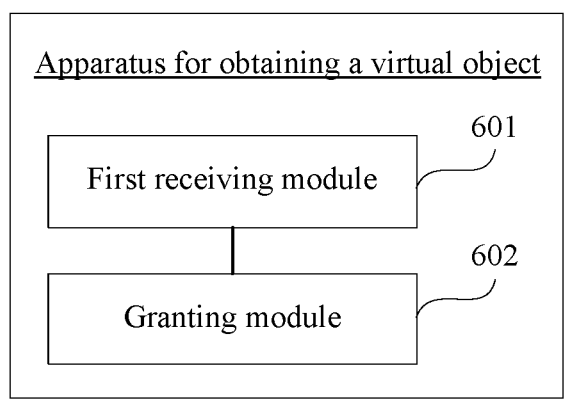
FIG. 6 is a block diagram of another apparatus for obtaining a virtual object according to an embodiment of the present disclosure.

FIG. 6 is a block diagram of an apparatus for obtaining a virtual object according to an embodiment of the present disclosure. The apparatus may be a server. Referring to FIG. 6, the apparatus includes: a first receiving module 601 and a granting module 602 configured to perform the S305 of the foregoing embodiment.

Figure 7:
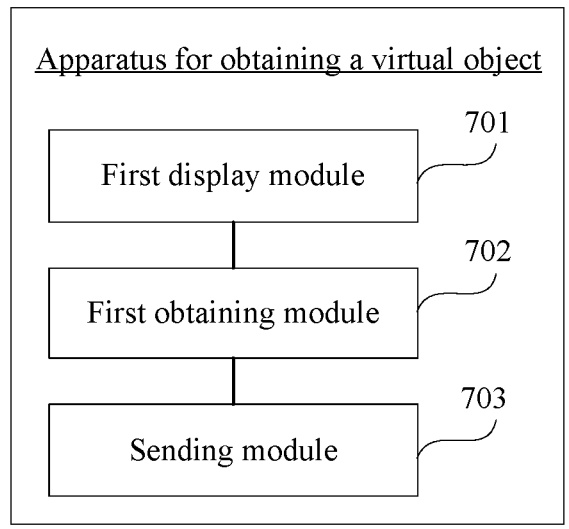
FIG. 7 is a block diagram of another apparatus for obtaining a virtual object according to an embodiment of the present disclosure.

FIG. 7 is a block diagram of an apparatus for obtaining a virtual object according to an embodiment of the present disclosure. The apparatus may be a terminal. Referring to FIG. 7, the apparatus includes a first display module 701, a first obtaining module 702, and a sending module 703.

The first display module 701 is configured to perform the S401 of the foregoing embodiments, the first obtaining module 702 is configured to perform the S402 of the foregoing embodiments, and the sending module 703 is configured to perform the S403 of the foregoing embodiment.

It should be noted that: when the apparatus for obtaining a virtual object provided in the foregoing embodiments interacts with the virtual object, division of each functional module is used only as an example for description. During actual application, the function distribution may be completed by different function modules according to the requirements, that is, divide the internal structures of the first terminal, the server, and the second terminal into different functional modules, so as to complete all or part of the functions described above. In addition, the apparatus for obtaining a virtual object provided in the foregoing embodiments and the embodiments of the method for obtaining a virtual object belong to one concept. For a specific implementation process, refer to the method embodiments, and details are not described herein again.

Figure 8:
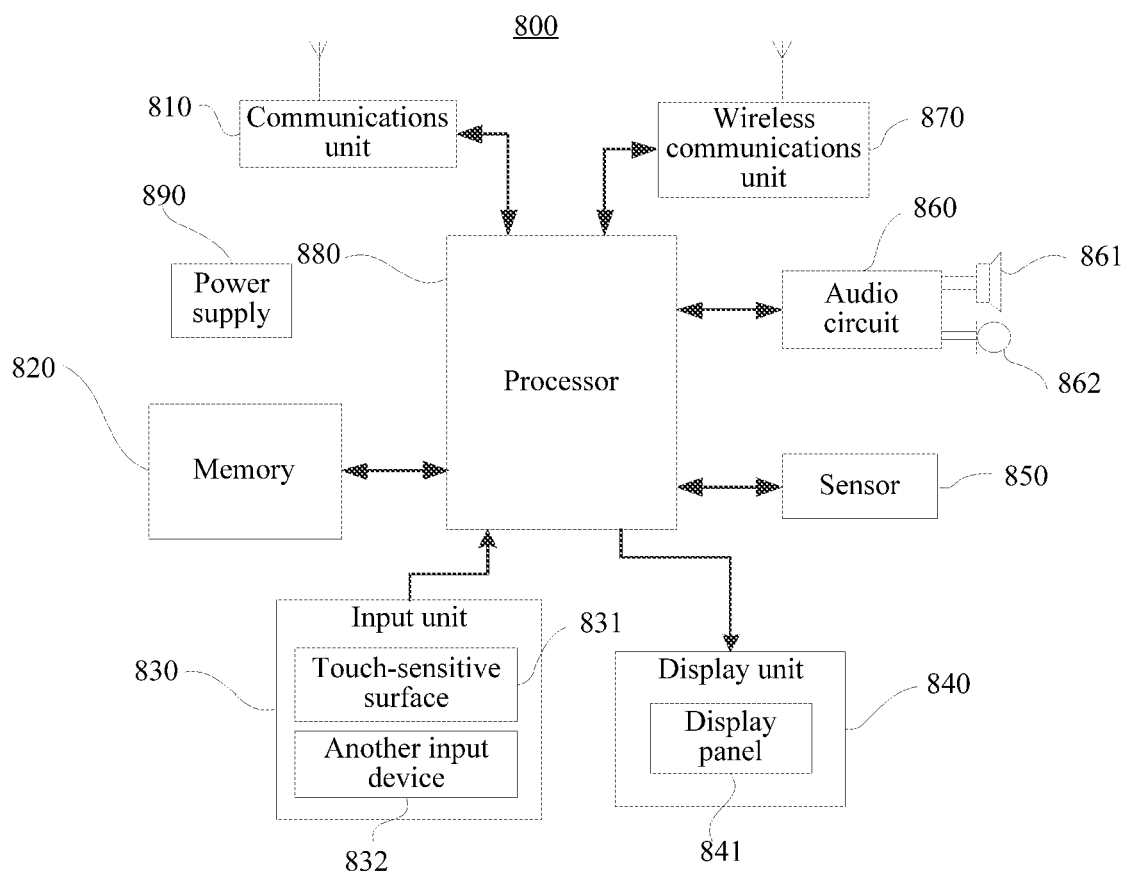
FIG. 8 is a schematic structural diagram of a terminal according to an embodiment of the present disclosure.

FIG. 8 is a schematic structural diagram of a terminal 800 according to an embodiment of the present disclosure. The terminal 800 may be the first terminal or the second terminal provided in the foregoing embodiments. The first terminal is a mobile terminal, and may be a mobile phone, a tablet, a portable computer, or the like. The second terminal may be a mobile phone, a tablet, a computer, or the like. This is not limited herein. Referring to FIG. 8, the terminal 800 may include a communications unit 810, a memory 820 including one or more computer readable storage media, an input unit 830, a display unit 840, a sensor 850, an audio circuit 860, a Wireless Fidelity (WiFi) module 870, a processor 880 including one or more processing cores, a power supply 890, and the like. A person skilled in the technology may understand that the structure of the terminal shown in FIG. 8 does not constitute a limitation to the terminal, and the terminal may include more or fewer components than those shown in the figure, or some components may be combined, or a different component deployment may be used.

The communications unit 810 may be configured to receive and send a signal during a process of receiving or sending information or a conversation, and the communications unit 810 may be a network communication device, such as a radio frequency (RF) circuit, a router, or a modem. Particularly, when the communications unit 810 is the RF circuit, the communications unit 810 receives downlink information of a base station, and then hands over the downlink information to one or more processors 880 for processing. In addition, the communications unit 810 sends related uplink data to the base station. Generally, the RF circuit used as the communications unit includes, but is not limited to, an antenna, at least one amplifier, a tuner, one or more oscillators, a subscriber identity module (SIM) card, a transceiver, a coupler, a low noise amplifier (LNA), and a duplexer. In addition, the communications unit 810 may further communicate with a network and other devices through wireless communication. The wireless communication may use any communications standard or protocol, which includes, but is not limited to, a Global System for Mobile communications (GSM), a General Packet Radio Service (GPRS), Code Division Multiple Access (CDMA), Wideband Code Division Multiple Access (WCDMA), Long Term Evolution (LTE), an e-mail, and a Short Messaging Service (SMS). The memory 820 may be configured to store a software program and module. The processor 880 runs the software program and module stored in the memory 820, to implement various functional applications and data processing. The memory 820 may mainly include a program storage area and a data storage area. The program storage area may store an operating system, an application program required by at least one function (such as a sound playback function and an image display function), and the like. The data storage area may store data (such as audio data and an address book) created according to use of the terminal 800, and the like. In addition, the memory 820 may include a high-speed random-access memory, and may further include a non-volatile memory, such as at least one magnetic disk storage device, a flash memory, or another volatile solid-state storage device. Correspondingly, the memory 820 may further include a memory controller, to provide access of the processor 880 and the input unit 830 to the memory 820.

The input unit 830 may be configured to receive input digit or character information, and generate a keyboard, mouse, joystick, optical or track ball signal input related to the user setting and function control. Preferably, the input unit 830 may include a touch-sensitive surface 831 and another input device 832. The touch-sensitive surface 831, also referred to as a touchscreen or a touch panel, may collect a touch operation of a user on or near the touch-sensitive surface (such as an operation of a user on or near the touch-sensitive surface 831 by using any suitable object or accessory, such as a finger or a stylus), and drive a corresponding connection apparatus according to a preset program. Optionally, the touch-sensitive surface 831 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 880. Moreover, the touch controller can receive and execute a command sent by the processor 880. In addition, the touch-sensitive surface 831 may be a resistive, capacitive, infrared, or surface sound wave type touch-sensitive surface. In addition to the touch-sensitive surface 831, the input unit 830 may further include the another input device 832. Preferably, the another input device 832 may include, but is not limited to, one or more of a physical keyboard, a functional key (such as a volume control key and a switch key), a track ball, a mouse, and a joystick.

The display unit 840 may be configured to display information input by the user or information provided for the user, and various graphical user interfaces of the terminal 800. The graphical user interfaces may be composed of graphics, text, icons, videos, and any combination thereof. The display unit 840 may include a display panel 841. Optionally, the display panel 841 may be configured by using a liquid crystal display (LCD), an organic light-emitting diode (OLED), and the like. Further, the touch-sensitive surface 831 may cover the display panel 841. After detecting a touch operation on or near the touch-sensitive surface 831, the touch-sensitive surface 831 transfers the touch operation to the processor 880, to determine a type of the touch event. Then, the processor 880 provides corresponding visual output on the display panel 841 according to the type of the touch event. Although, in FIG. 8, the touch-sensitive surface 831 and the display panel 841 are used as two separate parts to implement input and output functions, in some embodiments, the touch-sensitive surface 831 and the display panel 841 may be integrated to implement the input and output functions.

The terminal 800 may further include at least one sensor 850 such as an optical sensor, a motion sensor, and other sensors. The optical sensor may include an ambient light sensor and a proximity sensor, the ambient light sensor may adjust luminance of the display panel 841 according to the luminance of the ambient light, and the proximity sensor may switch off the display panel 841 and/or backlight when the terminal 800 moves to the ear. As one type of the motion sensor, a gravity acceleration sensor may detect a value of acceleration at each direction (which generally is triaxial), may detect a value and a direction of the gravity when being static, and may be configured to identify an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor, which can be configured in the terminal 800 is not described herein again.

The audio circuit 860, a speaker 861, and a microphone 862 may provide audio interfaces between the user and the terminal 800. The audio circuit 860 may transmit, to the speaker 861, an electric signal that is converted from received audio data. The speaker 861 converts the electric signal into a voice signal for outputting. On the other hand, the microphone 862 converts a collected voice signal into an electric signal. The audio circuit 860 receives the electric signal and converts it into audio data, and outputs the audio data to the processor 880 for processing. Then the processor 880 sends the audio data to another terminal by using the communications unit 810, or outputs the audio data to the memory 820 for further processing. The audio circuit 860 may further include an earplug jack, to provide communication between a peripheral earphone and the terminal 800.

To implement wireless communication, the terminal device may be configured with a wireless communications unit 870, and the wireless communications unit 870 may be a WiFi module. WiFi belongs to the short distance wireless transmission technology. The terminal 800 may help, by using the wireless communications unit 870, a user to receive and send an email, browse a web page, and access stream media, and the like, which provides wireless broadband Internet access for the user. Although the wireless communications unit 870 is shown in the figure, it may be understood that, the wireless communications unit does not belong to a necessary constitution of the terminal 800, and can be omitted within the scope of the essence of the present disclosure according to requirements.

The processor 880 is a control center of the terminal 800, which is connected to various parts of the entire mobile phone by using various interfaces and lines, and by running or executing a software program and/or module stored in the memory 820 and calling data stored in the memory 820, to perform various functions of the terminal 800 and process data, so as to perform overall monitoring on the mobile phone. Optionally, the processor 880 may include one or more processor cores. Preferably, the processor 880 may integrate an application processor and a modem processor. The application processor mainly processes an operating system, a user interface, an application program, and the like. The modem processor mainly processes radio communications. It may be understood that the foregoing modem processor may alternatively not be integrated into the processor 880.

The terminal 800 further includes the power supply 890 (such as a battery) for supplying power to the components. Preferably, the power supply may be logically connected to the processor 880 by using a power management system, thereby implementing functions such as charging, discharging, and power consumption management by using the power management system. The power supply 860 may further include one or more of a direct current or alternating current power supply, a re-charging system, a power failure detection circuit, a power supply converter or inverter, a power supply state indicator, and any other components.

Although not shown in the figure, the terminal 800 may further include a camera, a Bluetooth module, and the like. Details are not described herein.

In one embodiment, the terminal further includes one or more programs, and the one or more programs are stored in the memory and are configured to be executed by one or processors. The one or more programs include instructions corresponding to the method of the first terminal in the embodiment of FIG. 3A or FIG. 4 according to the embodiments of the present disclosure, or include instructions corresponding to the method of the second terminal in the embodiment of FIG. 3A or FIG. 4 according to the embodiments of the present disclosure.

Figure 9:
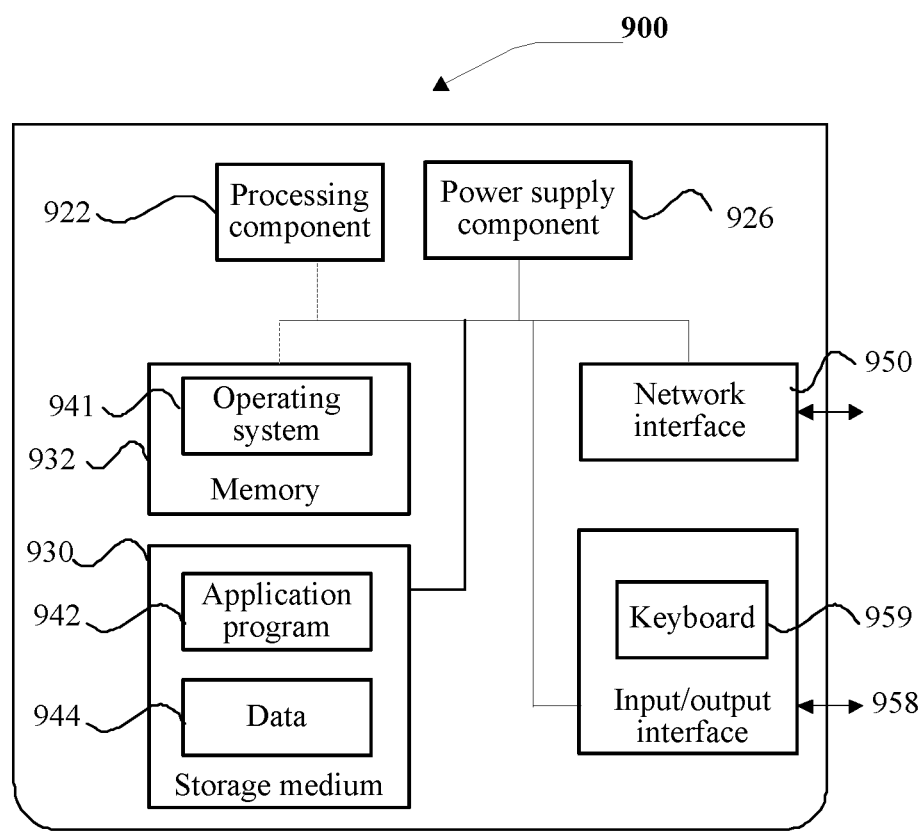
FIG. 9 is a schematic structural diagram of a server according to an embodiment of the present disclosure.

FIG. 9 is a schematic structural diagram of a server 900 according to an embodiment of the present disclosure. The server 900 may vary greatly due to different configurations or performance, and may include one or more central processing units (CPUs) 922 (for example, one or more processing components 922), a memory 932, and one or more storage media 930 (for example, one or more mass storage devices) that store an application program 942 or data 944. The memory 932 and the storage medium 930 may be transient or persistent storages. The application program stored in the storage medium 930 may include one or more modules (not shown in the figure), and each module may perform a series of instructions in the server. Still further, the processing component 922 may be configured to communicate with the storage medium 930, and perform, on the server 900, a series of instructions and operations in the storage medium 930.

The server 900 may further include one or more power supplies 926, one or more wired or wireless network interfaces 950, one or more input/output interfaces 958, one or more keyboards 959, and/or one or more operating systems 941, for example, Windows Server™, Mac OS X™, Unix™, Linux™, or FreeBSD™.

The apparatus 900 may be configured to perform the steps performed by the server in the foregoing embodiments.

The sequence numbers of the preceding embodiments of the present disclosure are merely for description purpose but do not indicate the preference of the embodiments. A person of ordinary skill in the technology may understand that all or some of the steps of the embodiments may be implemented by hardware or a program instructing related hardware. The program may be stored in a computer-readable storage medium. The storage medium may be a read-only memory, a magnetic disk, or an optical disc.

The foregoing descriptions are merely preferred embodiments of the to embodiments of the present disclosure, but are not intended to limit the embodiments of the present disclosure. Any modification, equivalent replacement, or improvement made within the spirit and principle of the embodiments of the present disclosure shall fall within the protection scope of the embodiments of the present disclosure.

What is claimed is:

1. A method applied to a first terminal for obtaining a virtual object, comprising:
   obtaining a first indoor position of the first terminal;
   obtaining a second indoor position of the virtual object, the second indoor position corresponding to the first indoor position and an identifier of the virtual object;
   while moving from the first indoor position into a first preset position range including the second indoor position, displaying an image shot by a camera;
   upon determining the image shot by the camera includes the second indoor position, displaying the virtual object corresponding to the identifier of the virtual object at a position in the image corresponding to the second indoor position;
   obtaining position information while moving from the first indoor position into the first preset position range including the second indoor position;
   determining, according to the position information, a moving route of from the first indoor position into the first preset position range including the second indoor position; and
   obtaining a selection operation on the virtual object displayed in the image, and sending an obtaining request for the virtual object to a server according to the selection operation upon determining that the moving route satisfies a preset moving policy, wherein the preset moving policy includes at least one of a preset moving distance, a preset exercise amount, or a preset moving route, wherein the preset moving policy is used for determining a moving format in which the first terminal moves from the first indoor position to the second indoor position, and wherein the obtaining request is used for requesting the server to grant the virtual object.

2. The method according to claim 1, wherein the obtaining the first indoor position comprises:
   receiving a beacon signal broadcasted by at least one beacon device disposed indoors, the beacon signal carrying an identifier of the beacon device;
   determining signal strength corresponding to the beacon signal as received; and
   obtaining the first indoor position according to the identifier of the beacon device in the beacon signal and the signal strength corresponding to the beacon signal as received.

3. The method according to claim 1, wherein the obtaining the second indoor position corresponding to the first indoor position and the identifier of the virtual object comprises:
   sending the first indoor position to the server, to cause the server to determine the second indoor position within a second preset position range away from the first indoor position and the identifier of the virtual object according to the first indoor position; and
   receiving from the server the second indoor position and the identifier of the virtual object.

4. The method according to claim 1, before displaying the virtual object corresponding to the identifier of the virtual object at the position in the image corresponding to the second indoor position, further comprising:
   obtaining a shooting angle of the camera according to a posture and a direction of the first terminal; and
   upon determining the shooting angle of the camera accords with a preset angle, determining that position corresponding to the image shot by the camera contains the second indoor position, the preset angle being determined according to a current position of the first terminal and the second indoor position.

5. The method according to claim 1, before displaying the virtual object corresponding to the identifier of the virtual object at the position in the image corresponding to the second indoor position, further comprising:
   restoring the image to a three-dimensional scene;
   identifying a position range of the three-dimensional scene; and
   upon determining the second indoor position is included in the position range of the three-dimensional scene, determining that the position corresponding to the image shot by the camera contains the second indoor position.

6. The method according to claim 1, wherein the displaying the virtual object corresponding to the identifier of the virtual object at the position in the image corresponding to the second indoor position comprises:
   obtaining a virtual object display style corresponding to the identifier of the virtual object; and
   generating the image according to the virtual object display style and the second indoor position, to cause the virtual object corresponding to the identifier of the virtual object to be displayed at the position in the image corresponding to the second indoor position.

7. The method according to claim 1, wherein the second indoor position is preset by a second terminal in sponsoring the virtual object as a present to a user at the first terminal.

8. An apparatus for processing a virtual object, applied to a server, comprising: a memory; and a processor coupled to the memory and configured to perform:
  receiving an obtaining request for the virtual object sent by a first terminal, wherein the first terminal is configured to:
    display, while moving from a first indoor position into a first preset position range including a second indoor position of the virtual object, an image shot by a camera;
    display, upon determining the image shot by the camera contains the second indoor position, the virtual object at a position in the image corresponding to the second indoor position;
    obtain position information while moving from the first indoor position into the first preset position range including the second indoor position;
    determine, according to the position information, a moving route of from the first indoor position into the first preset position range including the second indoor position;
    obtain a selection operation on the virtual object displayed in the image; and
    send the obtaining request according to the selection operation upon determining that the moving route satisfies a preset moving policy, wherein the preset moving policy includes at least one of a preset moving distance, a preset exercise amount, or a preset moving route, wherein the preset moving policy is used for determining a moving format in which the first terminal moves from the first indoor position to the second indoor position, and wherein the obtaining request carries an identifier of the virtual object; and
  granting the virtual object corresponding to the identifier of the virtual object to the first terminal.

9. The apparatus according to claim 8, wherein before receiving the obtaining request for the virtual object sent by the first terminal, the processor is further configured to perform:
  receiving first indoor position information sent by the first terminal, the first indoor position information being used for indicating the first indoor position of the first terminal; and
  sending second indoor position information to the first terminal according to the first indoor position information, the second indoor position information being used for indicating the second indoor position of the virtual object.

10. The apparatus according to claim 9, wherein the sending second indoor position information to the first terminal according to the first indoor position information comprises:
  determining the second indoor position information according to the first indoor position information and the preset moving policy;
  generating the virtual object corresponding to the second indoor position information; and
  sending the second indoor position information and the identifier of the virtual object to the first terminal.

11. The apparatus according to claim 8, wherein before receiving the obtaining request for the virtual object sent by the first terminal, the processor is further configured to perform:
  receiving a virtual object setting request sent by a second terminal, the virtual object setting request carrying the identifier of the virtual object, the second indoor position information, and a second user identifier currently logged into on the second terminal; and
  establishing a correspondence among the identifier of the virtual object, the second indoor position information, and the second user identifier.

12. The apparatus according to claim 11, wherein:
  the virtual object setting request further carries a designated user identifier, the designated user identifier is used for indicating a receiver of the virtual object;
  the receiving the obtaining request for the virtual object sent by the first terminal comprises: receiving the obtaining request for the virtual object sent by the first terminal, the obtaining request carrying a first user identifier currently logged into on the first terminal; and
  before granting the virtual object to the first terminal, the processor is further configured to perform: granting the virtual object corresponding to the identifier of the virtual object to the first terminal upon determining the first user identifier is the designated user identifier.

13. The apparatus according to claim 8, wherein the second indoor position is preset by a second terminal in sponsoring the virtual object as a present to a user at the first terminal.

14. A non-transitory computer-readable storage medium storing computer program instructions executable by at least one processor to perform:
  obtaining a first indoor position of the first terminal;
  obtaining a second indoor position of the virtual object, the second indoor position corresponding to the first indoor position and a corresponding an identifier of the virtual object;
  while moving from the first indoor position into a first preset position range including the second indoor position, displaying an image shot by a camera;
  upon determining the image shot by the camera includes the second indoor position, displaying the virtual object corresponding to the identifier of the virtual object at a position in the image corresponding to the second indoor position;
  obtaining position information while moving from the first indoor position into the first preset position range including the second indoor position;
  determining, according to the position information, a moving route of from the first indoor position into the first preset position range including the second indoor position; and
  obtaining a selection operation on the virtual object displayed in the image, and sending an obtaining request for the virtual object to a server according to the selection operation upon determining that the moving route satisfies a preset moving policy, wherein the preset moving policy includes at least one of a preset moving distance, a preset exercise amount, or a preset moving route, wherein the preset moving policy is used for determining a moving format in which the first terminal moves from the first indoor position to the second indoor position, and wherein the obtaining request is used for requesting the server to grant the virtual object.

15. The storage medium according to claim 14, wherein the obtaining the first current indoor position comprises:
    receiving a beacon signal broadcasted by at least one beacon device disposed indoors, the beacon signal carrying an identifier of the beacon device;
    determining signal strength corresponding to the beacon signal as received; and
    obtaining the first current indoor position according to the identifier of the beacon device in the beacon signal and the signal strength corresponding to the beacon signal as received.

16. The storage medium according to claim 14, wherein the obtaining a second indoor position corresponding to the first indoor position and a corresponding identifier of a virtual object comprises:
    sending the first indoor position to the server, to cause the server to determine the second indoor position within a second preset position range away from the first indoor position and the identifier of the virtual object according to the first indoor position; and
    receiving from the server the second indoor position and the identifier of the virtual object.

17. The storage medium according to claim 14, wherein before displaying the virtual object corresponding to the identifier of the virtual object at the position in the image corresponding to the second indoor position, the computer program instructions further cause the at least one processor to perform:
    obtaining a shooting angle of the camera according to a posture and a direction of the first terminal; and
    upon determining the shooting angle of the camera accords with a preset angle, determining that the position corresponding to the image shot by the camera contains the second indoor position, the preset angle being determined according to a current position of the first terminal and the second indoor position.

18. The storage medium according to claim 14, wherein before displaying the virtual object corresponding to the identifier of the virtual object at the position in the image corresponding to the second indoor position, the computer program instructions further cause the at least one processor to perform:
    restoring the image to a three-dimensional scene;
    identifying a position range of the three-dimensional scene; and
    upon determining the second indoor position is included in the position range of the three-dimensional scene, determining that the position corresponding to the image shot by the camera contains the second indoor position.

19. The storage medium according to claim 14, wherein the displaying the virtual object corresponding to the identifier of the virtual object at the position in the image corresponding to the second indoor position comprises:
    obtaining a virtual object display style corresponding to the identifier of the virtual object; and
    generating the image according to the virtual object display style and the second indoor position, to cause the virtual object corresponding to the identifier of the virtual object to be displayed at the position in the image corresponding to the second indoor position.

20. The storage medium according to claim 14, wherein the second indoor position is preset by a second terminal in sponsoring the virtual object as a present to a user at the first terminal.

* * * * *